April 16, 1963  E. F. DOLBEARE  3,085,597
HARNESS CONNECTION FOR LOOMS
Filed Oct. 10, 1961  2 Sheets-Sheet 1
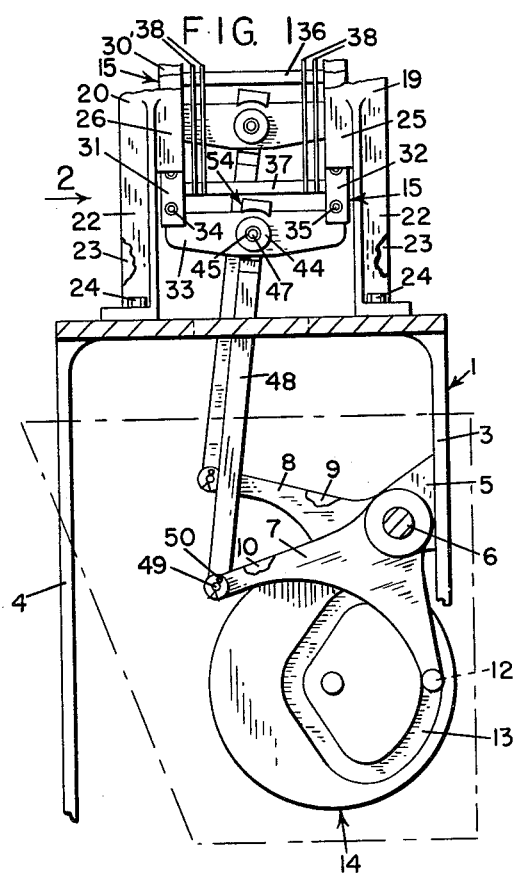
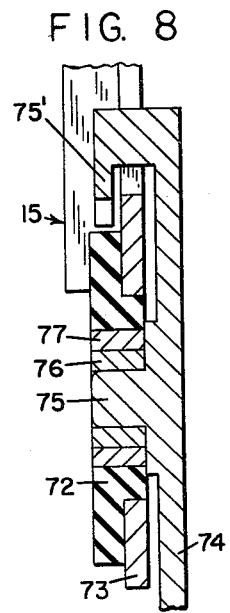
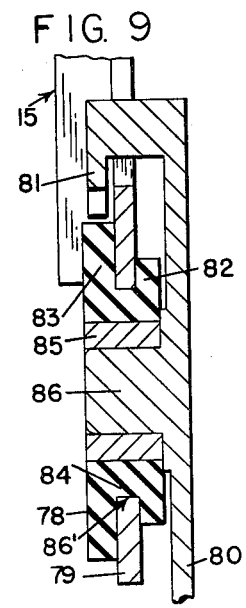
INVENTOR
EDWIN F. DOLBEARE
Charles T. Hawley
ATTORNEY April 16, 1963 E. F. DOLBEARE 3,085,597
HARNESS CONNECTION FOR LOOMS
Filed Oct. 10, 1961 2 Sheets-Sheet 2
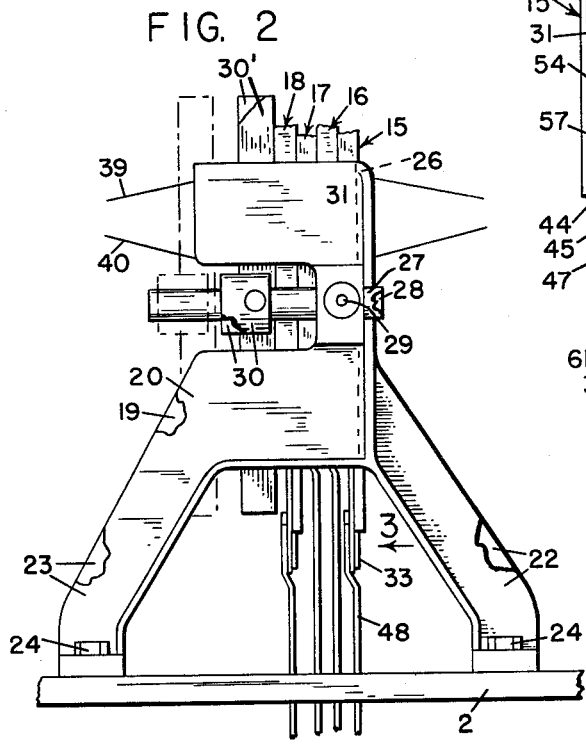
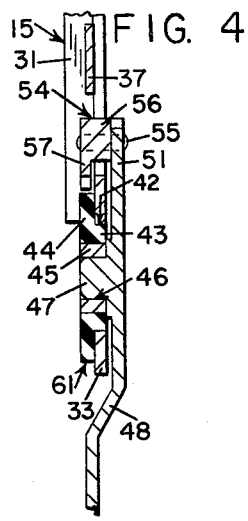
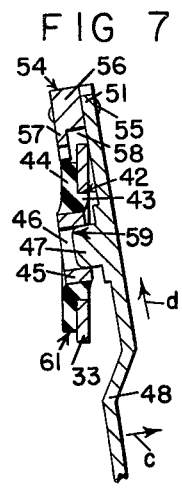
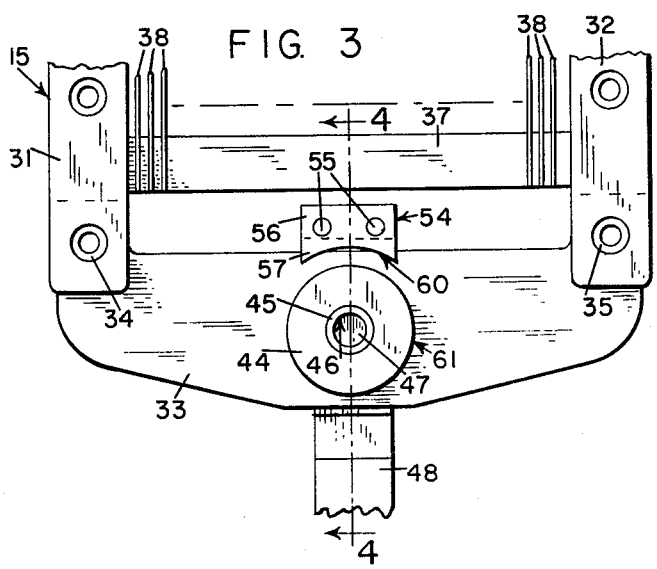
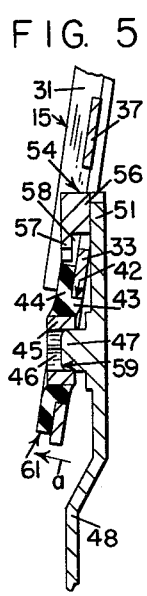
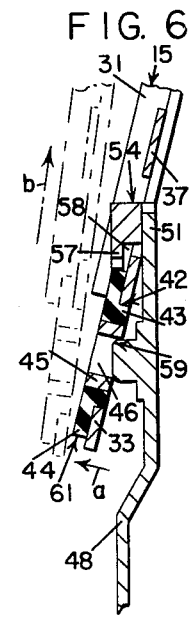
INVENTOR
EDWIN F. DOLBEARE
Charles T. Hawley
ATTORNEY

United States Patent Office 3,085,597
Patented Apr. 16, 1963

3,085,597
HARNESS CONNECTION FOR LOOMS
Edwin F. Dolbeare, Worcester, Mass., assignor to Crompton & Knowles Corporation, Worcester, Mass., a corporation of Massachusetts
Filed Oct. 10, 1961, Ser. No. 144,139
17 Claims. (Cl. 139—58)

This invention relates to improvements in harness frames for looms, and particularly relates to improvements in harness frame connections of the type set forth in Patent No. 2,907,352 issued to Clarence R. Kronoff October 6, 1959.

In the type of loom shown in the above cited patent and to which the present invention is applied, the harness frames are shifted vertically to form weft receiving sheds at a rate of over 1,000 shiftings per minute by cams which vertically reciprocate harness frame drivers each having one end thereof operatively connected to a rubber mounting cemented to the harness frame. Each driver, in addition to being reciprocated, also has an angular motion parallel to the plane in which its harness frame lies and, during this angular motion, the rubber mounting is subjected to undesirable shear stresses due to the fact that some of the rubber mounting moves angularly with the driver while some remains stationary. Because of the rapidity in which the loom operates and the shear stresses being applied to the rubber mounting, the latter soon becomes torn and damaged to the extent that it loses its effective operative connection to the driver and must be replaced frequently in order to prevent damage to the harness frames and attending parts. Moreover, frequent replacement of the rubber mounting results in considerable unwanted loss in production because of the speed at which the loom operates.

It is therefore an important object of the invention to overcome the undesirable and unwanted features discussed above by providing an operative connection between each harness frame reciprocator and its corresponding harness frame such that shear stresses to said connection during loom operation is prevented.

It is an object of the invention to provide an operative connection between the harness frame and its reciprocator to permit relative angular movement therebetween.

Another object of the invention is to attach a flexible element on a cross bar of the harness frame and to provide the element with a bearing member to snugly receive a projection extending from the reciprocator thereinto in a manner to allow said relative movement during reciprocation of the harness frame and also while the latter is stationary.

Still another object of the invention is to provide a harness frame connection including the flexible element and the reciprocator so as to permit quick release or separation of the reciprocator from the element, the reciprocator being provided with retaining means in constant registry with the cross bar to prevent transverse movement and detachment of the reciprocator during loom operation, and the retaining means permitting the transverse movement for quick release and detachment of the reciprocator from the cross bar when the loom is stopped.

A further object of the invention is to make the bearing member in two parts so that one part is firmly held to the other part but is removable in the event it need be removed without disturbing the flexible element.

A still further object of the invention is to make the flexible element in a manner to enable it to clamp itself to the cross bar, thus obviating any need for cement or fasteners to hold it thereto.

In order that the invention may be clearly understood reference is made to the accompanying drawings which illustrate by way of example three embodiments of the invention and in which:

FIG. 1 is a rear elevational view having the preferred form of the invention applied thereto, certain of the parts being in section and certain of the parts being broken away, FIG. 2 is an enlarged side elevational view looking in the direction of arrow 2, FIG. 1, FIG. 3 is an enlarged rear view of the lower part of a harness frame looking in the direction of arrow 3, FIG. 2, FIG. 4 is a vertical section on lines 4—4, FIG. 3, FIGS. 5–7 are cross sectional views illustrating the manner in which a harness frame and its reciprocator are detached from each other, and FIGS. 8 and 9 are sectional views similar to FIG. 4 but showing two modified forms of the invention.

Referring to FIG. 1, a loom frame generally designated as at 1 is provided with a table top 2 and right and left side supports 3 and 4 respectively which support the table top. Side support 3 mounts a bearing stand 5 to which a shaft 6 is suitably journaled for rotation during loom operation. Shaft 6 rockably supports harness frame actuating levers 7, 8, 9 and 10, each of which is provided with a roll 12 to fit a groove 13 in a cam 14, only one roll and one cam being shown in FIG. 1. It is to be understood that there will be an actuator lever and a corresponding cam therefore for each of the harness frames designated generally by the reference characters 15, 16, 17 and 18, see FIG. 2.

Table 2 supports right and left harness frame guides 19 and 20 respectively between which the harness frames 15-18 are vertically reciprocated. Each of the guides 19 and 20 is provided with a rear and forward leg 22 and 23 respectively which are bolted to the table 2 as at 24. The rear end of each of the guides 19 and 20 is provided with a rear wall 25 and 26 respectively to prevent rearward movement of the harness frames during loom operation. Horizontal rods 27 and 28, see FIG. 2, are fixed respectively to guides 19 and 20 as at 29. Each rod carries a collar 30 which supports a forward wall 30' to prevent forward movement of the harness frames during loom operation. It will be seen that walls 25, 26 and 30' prevent back and forth swaying of the harnesses during loom operation and that guides 19 and 20 prevent angular motion or tipping of the frames. The matter thus far described is of usual construction and operation and forms no part of the present invention except as set forth hereinafter.

The harness frames, their corresponding operative connections to their reciprocators, and the latter are all identical in the preferred form of the invention, and it is deemed only necessary here to describe one of the harness frames and its connection and reciprocator, namely, harness frame 15.

In carrying out the preferred form of the invention and referring particularly to FIGS. 3 and 4, harness frame 15 is provided with left and right sides 31 and 32 at the bottom of which a cross bar 33 is fastened as by rivets 34 and 35 respectively. It is to be understood that harness frame 15 has a top cross bar, which is not shown, to complete the harness frame. Frame 15 carries upper and lower heddle straps 36 and 37, see FIG. 1, which support heddles 38 through which warp yarns 39 and 40 are threaded to form warp sheds to receive the weft thread as is well known in the art.

Cross bar 33 is provided with a hole 42 to receive the hub 43 of a flexible element 44. This element may be made of rubber, for example, and is conveniently bonded in a plane parallel to cross bar 33, as is usual. The flexible element 44 is provided with a bearing member 45 which is cemented thereto. Member 45 is in the form of a short bushing and laterally extends into the flexible element and is provided with a circular hole 46 to snugly receive a projection 47 on a reciprocator 48, the lower end of which is attached to actuator 7 as at 49 by means of a cotter pin 50, see FIG. 1. The upper end 51 of reciprocator 48 has removably fastened thereto retaining hook means, generally designated by the reference character 54, which is held to the upper part of the actuator 48 by removable fasteners 55, see FIGS. 3 and 4. Member 45 may or may not be oil-impregnated as desired.

As can readily be seen in the just mentioned figures, hook means 54 has a laterally extending portion 56 which straddles cross bar 33 and from which a downwardly extending portion 57 extends in front of cross bar 33 to form an inverted L-shaped hook which is constantly in register with the cross bar. The portions 56 and 57 and end 51 define a space 58, FIGS. 5–7, into which part of the cross bar 33 extends so as to be maintained operatively connected to the reciprocator during loom operation.

The projection 47 extends laterally from the reciprocator 48 and has the same configuration as hole 46 and is provided with rounded edge 59 to facilitate removal of the reciprocator 48 from harness frame 15, as will be decribed hereinafter.

As can be seen in FIG. 3, hook 54 is provided with an arcuate surface 60 concentric with and spaced from the periphery 61 of the flexible member 44. Flexible member 44, projection 50 and hook 54 constitutes an operative connection between the frame 15 and reciprocator 48, and element 44 and member 45 may be considered as a bearing unit.

During loom operation all of the harness frames will be reciprocated but the operation of only one will be described herein insofar as the operation is the same for all frames. Cam 14 will be rotated to actuate reciprocators 48 to raise and lower harness frame 15 in accordance with the pattern of the cam. During reciprocation of the harness frame, the reciprocator 48 will have a slight angular motion in a plane parallel to the plane occupied by the cross bar as can readily be seen in FIG. 1. This angular motion which is also transmitted to the projection 47 will have no shearing effect on the flexible member 44, that is, it will not rotate the flexible member due to the fact that projection 47 snugly and pivotally fits bearing member 45 and can move angularly relative thereto as well as relative to element 44. This type of connection prevents the application of shear stresses to the flexible element 44.

When it is desired to separate harness frame 15 from its reciprocator 48, collars 30 are loosened and they and their walls 30' are slid along bars 27 and 28 to the dotted line position shown in FIG. 2 to permit back and forth play between the harness frames 15—18. Frames 15 may be manually grasped and tilted in the direction of arrow $a$ to the position shown in FIG. 5 because of the flexibility of the element 44, space 58, and the play produced by loosening walls 30'. After the harness frame has been tilted as shown in FIG. 5, it then can be further moved in direction $a$ away from actuator 48 to the dot and dash lines of FIG. 6 and thence upwardly in the direction of arrow $b$ for removal from between the harness frame guides. The harness frame then, of course, can be replaced by reversing the operation just described. It is to be noted that element 44 can be flexed back and forth in a direction crosswise of the cross bar plane to effect release of the frame from its reciprocator.

If it is desired to let the harness frame remain in its position between the guide walls, the cotter pin 50 can be removed and the reciprocator 48 tilted transversely to the cross bar plane to that position shown in FIG. 7 and thence further in the same direction as designated by the arrow $c$ to clear projection 47 from hole 46 followed by a slight upward movement in the direction of arrow $d$ which will effect release or detachment of the reciprocator 48 from the harness frame.

In the first modified form of the invention as seen in FIG. 8, a flexible element 72 is attached to a cross bar 73 as in the preferred form of the invention or by fasteners such as screws, not shown but well understood in the art. A reciprocator 74 is provided with a projection 75 to snugly fit an inner bearing part 76 press fitted to a ring 77 which is held to the element 72 by cementing. Ring 77 may be considered as one part of the two-part bearing and part 76 as the other part of said bearing, the other part being removable from ring 77 in the event said other part requires replacement, due to wear for instance. Part 76 and ring 77 form a two-part bearing member for projection 75 and, with the exception of this two-part bearing member, the reciprocator, the element and cross bar 73 are similar to the corresponding parts in the preferred form of the invention. However, reciprocator 74 is provided with a hook 75' similar to hook means 54 with the exception that hook 75' is an integral part of reciprocator 74. The operation of removal and attachment of the reciprocator with respect to the harness frame is the same as that described with reference to the preferred form of the invention, and it is deemed unnecessary to describe that operation as it applies to this modified form. Also, it is to be noted that projection 75 and part 76 are pivotally connected to permit relative angular motion therebetween to avoid the application of shear stresses to element 72 as is the case in the preferred form of the invention.

The second modified form of the invention, FIG. 9, is quite similar in many respects to the preferred and first modified form in that there is a flexible element generally designated at 78, a cross bar 79, a reciprocator 80 and a hook means 81, all operatively connected quite similar to the other forms of the invention. Element 78, however, is provided with a flange 82 spaced from a flange 83 to define a space therebetween for the reception of cross bar 79. The element 78 is also provided with a hub 84 which joins the flanges 82 and 83. A bearing member 85, similar to bearing 45, is bonded to the hub and flanges and is apertured to receive a stud 86 extending transversely from reciprocator 80. Removal and attachment of reciprocator 80 from its corresponding harness frame will be the same as that shown in the preferred and first forms of the invention. In the third form of the invention, flexible element 78 is in the form of a removable grommet and can be applied to bar 79 by snapping flange 82 through a hole 86' in cross bar 79 so that flanges 82 and 83 when applied to bar 79 clamps itself thereto and obviates the necessity of utilizing cement fasteners to hold element 78 to bar 79.

In all forms of the invention, the projections will extend laterally from their reciprocators and will snugly and pivotally fit a bearing member attached to a flexible element in such a manner as to permit quick release of the reciprocator from the harness frame, and as will be noted in all forms of the invention, the hook means acts as a retainer to maintain the reciprocator operatively connected to the harness frame to prevent any appreciable transverse movement of the reciprocator with respect to the harness frame during loom operation, and yet the hook means does not prevent quick release of the reciprocator from the harness frame.

From the foregoing it will be seen that the invention provides simple separable connective means between a harness frame and its reciprocator to permit relative angular motion therebetween during reciprocation thereof to prevent shear stresses being applied to a flexible element forming part of the connective means. It will be seen further that the reciprocator when moving angularly does so without moving any portion of the flexible element angularly. Moreover, it will be seen that simple but effective retaining means are provided to maintain the separable connective means intact during loom operation and yet permit quick and easy detachment of the reciprocator from the harness frame either by moving the harness frame or by moving the reciprocator as described hereinbefore. Also, it will be seen that the invention provides for a flexible element having the ability to clamp itself to the cross bar so that there is no need for a cementing operation to hold it thereto. And further, each element in each form of the invention is capable of being flexed backwardly and forwardly transversely of the cross bar plane to facilitate separation of the connective means.

Having now particularly described and ascertained the nature of the invention and in what manner the same is to be performed, what is claimed is:

1. In a loom operating to reciprocate a harness frame having a bottom cross bar fixed thereto, a flexible element attached to said bar in a plane parallel thereto, a bearing member attached to said element perpendicularly with respect to said plane, a harness frame reciprocator having a projection extending perpendicularly therefrom to snugly fit said member and movable with respect thereto, and retaining means between the reciprocator and the cross bar to maintain said reciprocator operatively connected to said cross bar during loom operation.

2. The loom set forth in claim 1 wherein said flexible element has a circular periphery and is provided with a hole to receive said bearing member.

3. The loom set forth in claim 1 wherein said bearing member is provided with a circular hole to receive said projection.

4. The loom set forth in claim 3 wherein said projection is of the same configuration as said hole and extends fully thereinto.

5. The loom set forth in claim 1 wherein the retaining means is removably attached to the upper end of said reciprocator.

6. The loom set forth in claim 2 wherein said retaining means is provided with an arcuate surface spaced from and concentric with said periphery.

7. The loom set forth in claim 1 wherein said retaining means is L-shaped and is invertedly applied to the reciprocator to form a hook to straddle said cross bar.

8. The loom set forth in claim 1 wherein said bearing member is an oil-impregnated bushing to avoid the need for applying oil thereto.

9. In a loom operating to reciprocate harness frames each having a cross bar operatively connected to a harness frame reciprocator having an angular movement during reciprocation thereof, a flexible element on said bar operatively connected to said reciprocator and susceptible to shear stresses during said angular movement, and means on said flexible member operatively connected to and coacting with means on said reciprocator to prevent said shear stresses during angular movement of said reciprocator.

10. The loom set forth in claim 9 wherein said means on said flexible member is a short bushing, and the means on said reciprocator is in the form of a stud, both the tube and stud being operatively connected pivotally to have relative movement therebetween to prevent the occurrence of said shear stress during angular movement of said reciprocator.

11. In a loom operating to reciprocate a harness frame having a cross bar operatively connected to a harness frame reciprocator, a bearing unit having a flexible member and operatively connected to said reciprocator in a manner to permit relative movement between the unit and the reciprocator in a plane parallel the cross bar and relatively transversely thereof, and retaining hook means constant in registry with the cross bar during loom operation to prevent transverse movement of said reciprocator and detachment thereof from said bar, yet permitting the transverse movement for quick release of the latter with respect to said reciprocator when the loom is stopped.

12. The loom set forth in claim 11 wherein said flexible member of said unit is capable of being flexed back and forth in a direction crosswise of said plane to effect release of said harness frame from said reciprocator.

13. In a loom operating to reciprocate a harness frame having a bottom cross bar fixed thereto, a flexible element attached to said bar in a plane parallel thereto, a two-part bearing member attached to said element transversely of said plane, a harness frame reciprocator having a projection extending therefrom to snugly fit one of the parts of said two-part bearing member and movable with respect thereto, and hook means on the reciprocator to straddle the cross bar to maintain said reciprocator operatively connected to said cross bar during loom operation.

14. The loom set forth in claim 13 wherein one part of the two-part bearing member is a ring cemented to the flexible element and the other part of the two-part bearing is a bushing press fitted into said one part and removable therefrom in the event said other part requires replacement.

15. The loom set forth in claim 13 wherein the hook means is integral with said reciprocator.

16. In a loom operating to repicrocate a harness frame having a bottom cross bar fixed thereto, a flexible element attached to said bar in a parallel plane thereto and having a flange on one side of the bar and another flange on the other side of the bar to effect clamping of the element to said bar, a hub between said flanges extending through said bar, a bearing member extending through said hub into said flanges, a reciprocator having a stud extending into said bearing member snugly to permit relative angular motion between the bearing member and the reciprocator, and a hook on the reciprocator over-lying the cross bar to maintain the bearing member and the stud in operative connection during loom operation.

17. The loom set forth in claim 16 wherein the flexible element is in the form of a grommet for easy removal from and attachment to said cross bar.

References Cited in the file of this patent

UNITED STATES PATENTS 2,069,330    Rossmann _____ Feb. 2, 1937

FOREIGN PATENTS 1,160,622    France _____ Mar. 3, 1958